United States Patent
Grisi

(10) Patent No.: US 9,194,326 B2
(45) Date of Patent: Nov. 24, 2015

(54) METHOD FOR CONTROLLING THE START-UP OF A VEHICLE COMPRISING AN ENGINE START-STOP SYSTEM

(75) Inventor: Fabrice Grisi, La Garenne Colombes (FR)

(73) Assignee: PEUGEOT CITROËN AUTOMOBILES SA, Velizy Villacoublay (FR)

( * ) Notice: Subject to any disclaimer, the term of this patent is extended or adjusted under 35 U.S.C. 154(b) by 303 days.

(21) Appl. No.: 13/824,560

(22) PCT Filed: Sep. 21, 2011

(86) PCT No.: PCT/FR2011/052169
§ 371 (c)(1),
(2), (4) Date: Apr. 10, 2013

(87) PCT Pub. No.: WO2012/049385
PCT Pub. Date: Apr. 19, 2012

(65) Prior Publication Data
US 2013/0211697 A1    Aug. 15, 2013

(30) Foreign Application Priority Data
Oct. 11, 2010 (FR) ..................... 10 58249

(51) Int. Cl.
*B60T 7/12* (2006.01)
*B60W 10/02* (2006.01)
*B60W 30/18* (2012.01)
(Continued)

(52) U.S. Cl.
CPC ................. *F02D 45/00* (2013.01); *B60T 7/122* (2013.01); *B60W 10/02* (2013.01); *B60W 10/06* (2013.01); *B60W 30/18027* (2013.01); *B60W 30/18054* (2013.01); *B60W 30/18063* (2013.01); *B60W 30/1888* (2013.01); *B60W 30/18118* (2013.01); *B60W 2710/021* (2013.01); *B60W 2710/0644* (2013.01); *B60W 2710/0655* (2013.01)

(58) Field of Classification Search
CPC .......... F02D 45/00; B60W 2710/0655; B60W 2710/021; B60W 10/02; B60W 10/06; B60W 30/18054; B60W 30/18063; B60W 30/18118; B60W 30/1888; B60W 30/18027; B60W 2710/0644; B60T 7/122
USPC ........... 701/112; 123/179.4; 903/946; 477/70
See application file for complete search history.

(56) References Cited

U.S. PATENT DOCUMENTS 6,258,008 B1   7/2001  Tabata et al.
6,875,154 B2 * 4/2005  Mitsutani et al. ............. 477/107
(Continued)

FOREIGN PATENT DOCUMENTS

DE    19943788 A1   5/2000
EP    1348895 A2   10/2003

OTHER PUBLICATIONS

International Search Report from corresponding International Application No. PCT/FR2011/052169 mailed Jun. 29, 2012.

*Primary Examiner* — Hieu T Vo
*Assistant Examiner* — Arnold Castro
(74) *Attorney, Agent, or Firm* — Polster, Lieder, Woodruff & Lucchesi, L.C.

(57) ABSTRACT

The invention relates to a method for controlling the start-up of a vehicle comprising an engine start-stop system, wherein the method includes the actuation of the start-up of the vehicle. The invention is characterized in that the method comprises the steps: an autonomous engine state is indicated in response to the simultaneous occurrence of (i) the injection of fuel into the combustion chambers of the engine and (ii) an engine speed above a pre-defined threshold S1 which is equal to an engine speed that cannot be achieved without combustion in the combustion chambers during the start-up of the vehicle; and, in response to the aforementioned autonomous engine state indication, the closing of a clutch is controlled according to a pre-defined engine speed set value in order to control the engine speed to the pre-defined set value.

8 Claims, 2 Drawing Sheets

(51) Int. Cl.
*F02D 45/00* (2006.01)
*B60W 10/06* (2006.01)
*B60W 30/188* (2012.01)

(56) References Cited

U.S. PATENT DOCUMENTS

| | | |
|---|---|---|
| 8,838,309 B2 * | 9/2014 | Steuernagel et al. ........... 701/22 |
| 2003/0073540 A1 | 4/2003 | Eguchi et al. |
| 2005/0016781 A1 * | 1/2005 | Muta ........................... 180/65.2 |
| 2005/0082098 A1 | 4/2005 | Ito et al. |
| 2006/0166789 A1 | 7/2006 | Katou et al. |
| 2010/0174465 A1 | 7/2010 | O'Connor Gibson et al. |
| 2010/0251984 A1 * | 10/2010 | Bouchon et al. ............ 123/179.3 |
| 2011/0136620 A1 * | 6/2011 | Gibson et al. ................... 477/64 |
| 2011/0146945 A1 * | 6/2011 | Morita et al. .................... 165/51 |
| 2012/0172175 A1 * | 7/2012 | Nedorezov et al. ........... 477/169 |
| 2014/0032026 A1 * | 1/2014 | Hancock et al. ................ 701/22 |

* cited by examiner

METHOD FOR CONTROLLING THE START-UP OF A VEHICLE COMPRISING AN ENGINE START-STOP SYSTEM

CROSS-REFERENCE TO RELATED APPLICATIONS

This application is the US national stage under 35 U.S.C. §371 of International Application No. PCT/FR2011/052169 having an international filing date of Sep. 21, 2011 which claims the priority of the French Application 1058249 filed on Oct. 11, 2010 the content of which (text, drawings and claims) is incorporated here by reference.

BACKGROUND

The invention relates to a method for controlling the start-up of a vehicle comprising an engine start-stop system. The invention further relates to a data recording medium and to a control device for carrying out the method. Finally, the invention relates to a vehicle comprising this control device.

The engine start-stop system is better known under the term "start and stop." Subsequently, only the expression "start and stop" is used.

The invention applies particularly to hybrid vehicles. A "hybrid vehicle" is a vehicle whose engine (power train) comprises a internal combustion engine and an electrical machine, each capable of supplying a torque to an output shaft of a crankshaft so as to rotationally drive the driving wheels of the vehicle.

Among these hybrid vehicles, vehicles integrating the "stop and start" technology make it possible to optimize the fuel consumption of a vehicle by stopping the operation of the internal combustion engine when the vehicle is at a standstill, and by restarting the internal combustion engine, for example, when the driver of the vehicle releases the pressure on the brake pedal. The restarting of the vehicle can be in the form of an initial start-up or an assisted start-up.

"Initial start-up" denotes the start-up of the internal combustion engine during which the rotation of the output shaft of the crankshaft is initiated by an electric starter. "Assisted start-up" denotes a start-up of the internal combustion engine during which the rotation of the output shaft of the crankshaft is initiated by a starter alternator.

The starter and the starter alternator are electrical machines that use an electrical source such as a battery. The operation of a starter or of a starter alternator itself is known. Typically, The starter or the starter alternator rotationally drives the output shaft of the crankshaft until a predetermined engine speed has been reached. "Engine speed" denotes a speed of rotation of the crankshaft output shaft expressed, for example, in rotations per minute. Once this engine speed has been established, a controller controls a maximum fuel injection in the combustion cylinders of the internal combustion engine, and then it adjusts the injection so that the engine speed stabilizes. From then on the starter or the starter alternator stops rotationally driving the output shaft of the crankshaft, and the internal combustion engine operates autonomously.

The vehicles that integrate the "stop and start" technology are particularly well suited for driving in an urban environment where the number of starts and stops is important.

In the continuation of this description, the abbreviated term "stop and start vehicle" is used to denote a vehicle that integrates the "stop and start" technology.

Motor vehicles that are known to the applicant comprise a controlled mechanical gearbox (CMG). The term "controlled mechanical gearbox" denotes a gearbox in which the gear change is assisted electronically. This type of gearbox allows an automatic or sequential changing of gears. Typically, in an automatic change, the gear change is managed by an electronic controller. During a sequential change, the gear change is managed by a driver.

These CMGs have the advantage of actuating a gear change only when optimal engine speed and torque conditions are combined. Thus, the extreme cases where the internal combustion engine stalls or runs over-speed are limited.

In this description, the term "engine torque" is used for the torque supplied by the internal combustion engine to the crankshaft output shaft.

During the start-up of a vehicle comprising a CMG, a clutch rotatably connects the crankshaft output shaft to a driveshaft of the driving wheels. Consequently, the driveshaft taps a torque from the crankshaft output shaft in order to cause movement of the vehicle. If the torque tapped by the driveshaft is greater than the engine torque, the internal combustion engine inexorably stalls.

Thus, it is an inherent disadvantage of these controlled gearboxes that it is difficult to control the clutch during the start-up. This disadvantage is particularly problematic in the case of stop and start vehicles where the number of starts is consistent.

In addition, it is necessary to perform the start-up as rapidly as possible.

SUMMARY

The invention aims to solve above-noted disadvantages.

The invention thus relates to a method for controlling the start-up of a vehicle comprising an engine start-stop system, the method comprising:

the actuation of the start-up of the vehicle, the indication of an autonomous engine state in response to the simultaneous occurrence of the injection of fuel into the combustion chambers of the internal combustion engine and an internal combustion engine speed above a predefined threshold S1, the threshold S1 being equal to an engine speed that cannot be achieved without combustion in the combustion chambers during the start-up of the vehicle, and in response to the autonomous engine state indication, the control of the closing of the clutch according to a predefined engine speed set value to control the engine speed to this predefined set value, the clutch making it possible to mechanically connect the driving wheels of the vehicle to a crankshaft output shaft of the engine.

In the method presented above, a rapid start-up of the stop and start vehicle is carried out by controlling the clutch as soon as the engine is autonomous, that is as soon as the internal combustion engine has the capacity of supplying a torque to the driveshaft of the driving wheels. The control of the engine speed makes it possible for the internal combustion engine not to stall during the start-up.

The embodiments of this method can comprise one or more of the following characteristics:

as long as there is no autonomous engine state indication, the clutch is controlled so as to disconnect the driving wheels of the vehicle at the crankshaft output shaft, the method also comprises:

the delay of the use of an assist device for uphill start-up assistance until the end of a duration T1 has elapsed since the autonomous engine state indication, the duration T1 being predefined in such a manner that once the delay has elapsed, if the braking system is released, the engine torque is sufficiently high to cause movement of the vehicle only in the forward direction without backward movement, the emission of an available torque signal once the duration T1 has elapsed, and the control of the assist device for uphill start-up assistance in response to the re-emission of this signal to release the braking system.

the threshold S1 and/or the duration T1 are predefined according to a measured engine temperature and/or atmospheric pressure, the method also comprises:

the emission of a precise torque signal after a duration T2 has elapsed since the re-emission of the available torque signal, and the calculation or estimation of the torque supplied by the engine in response to the emission of this precise torque signal.

the duration T2 is predefined according to the measured engine temperature and/or atmospheric pressure.

The invention also relates to a data recording medium including instructions for carrying out the above method, when these instructions are carried out by an electronic controller.

The invention also relates to a device for controlling the start-up of a vehicle comprising an engine start-stop system, said device comprising:

sensors for measuring or estimating the quantity of fuel injected into the combustion chambers and an engine speed, and an electronic controller programmed:

to actuate the start-up of the vehicle, to indicate an autonomous engine state in response to the simultaneous occurrence of the injection of fuel into the combustion chambers of the internal combustion engine, and an internal combustion engine speed above a predefined threshold S1, the threshold S1 being equal to an engine speed that cannot be achieved without combustion in the combustion chambers during the start-up of the vehicle, and in response to the autonomous engine state indication, to control the closing of a clutch according to a predefined engine speed set value to control the engine speed to this predefined set value, the clutch making it possible to mechanically connect the driving wheels of the vehicle to a crankshaft output shaft of the engine.

Finally, the invention relates to a device comprising this control device.

DESCRIPTION OF THE FIGURES

Other characteristics and advantages of the invention will be clarified by the description provided below for information and in a non-limiting manner, in reference to the appended drawings, in which.

In the continuation of this description, the characteristics and the functions that are well known to the person skilled in the art are not described in detail.

Figure 1:
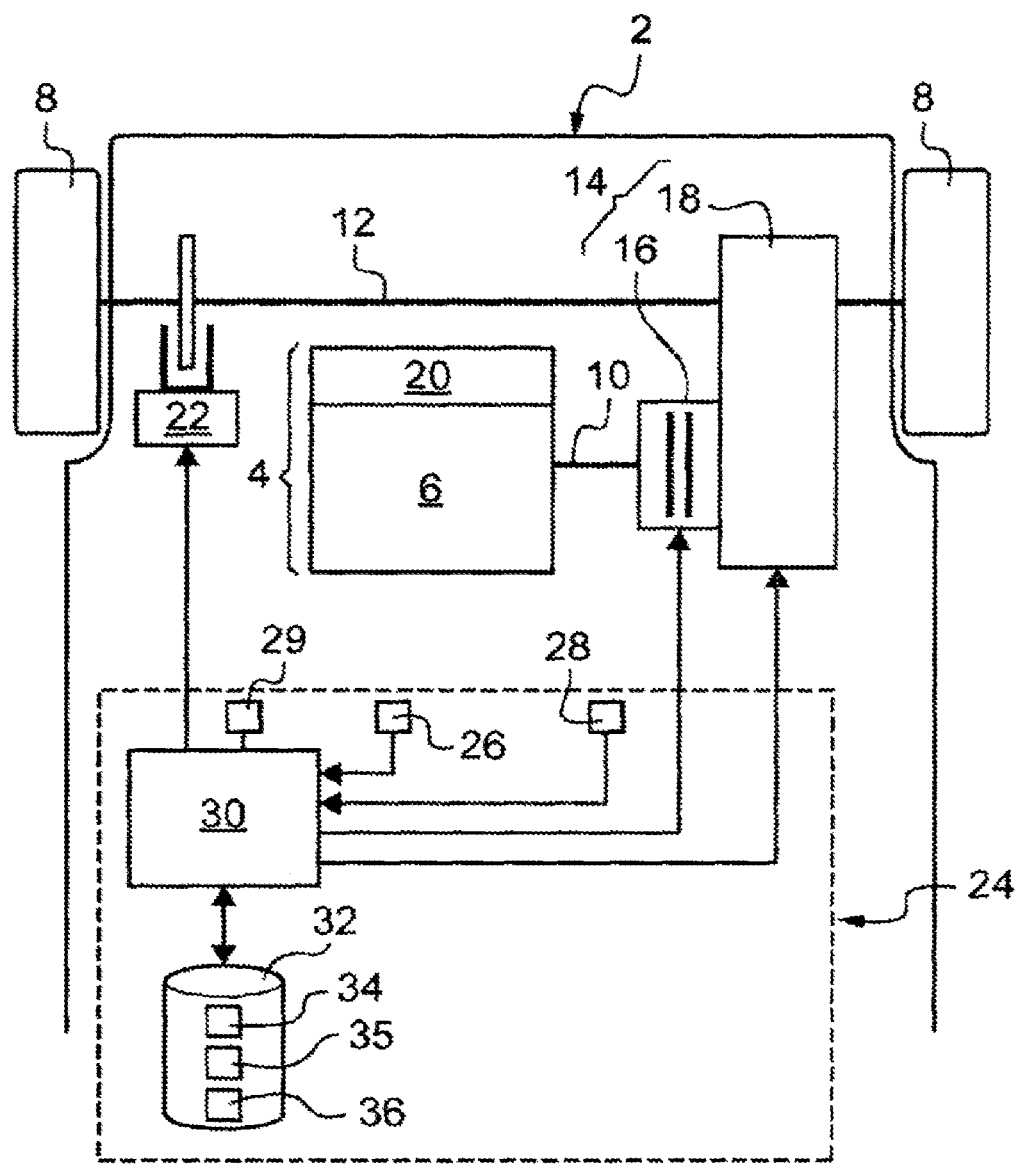
FIG. 1 is a diagrammatic illustration of a hybrid vehicle comprising a start-up control unit.

FIG. 1 represents a hybrid vehicle 2. For example, the vehicle 2 is a motor vehicle, such as a car. Here, the vehicle 2 is a stop and start vehicle.

The vehicle 2 comprises a power train 4 including an internal combustion engine 6. In this example, the internal combustion engine 6 is a Diesel engine.

The internal combustion engine 6 is capable of rotationally driving the front driving wheels 8 of the vehicle 2. For this purpose, the internal combustion engine 6 comprises a crankshaft output shaft 10 rotatably connected to a driveshaft 12 of the driving wheels 8 by means of a power train 14.

The power train 14 comprises a clutch 16 and a controlled mechanical gearbox 18.

The clutch 16 makes it possible to alternatingly connect and disconnect the crankshaft output shaft 10 to and from the driveshaft 12 of the driving wheels 8. In the example, the clutch 16 is controlled electronically. In addition, the vehicle 2 here does not include a clutch pedal.

The controlled gearbox 18 makes it possible to carry out the torque adaptation between the engine torque and the torque tapped by the shaft 12. For this purpose, the box 18 includes a set of pinions and/or claws forming reduction gears (or gears). The change from a gear is assisted electronically. Here, the change from a gear is sequential.

The clutch 16 and the controlled mechanical gearbox 18 themselves are known. Consequently, they will not be the subject of a more detailed description.

The power train 4 also includes an electrical machine 20. This electrical machine 20 includes a starter and a starter alternator for carrying out an initial start-up and an assisted start-up of the vehicle 2. To simplify FIG. 1, the starter and the starter alternator are not represented in this figure.

The vehicle 2 also includes an assist device 22 for uphill start-up assistance (also known under the term "hill assist"). The device 22 includes a braking system that makes it possible to stop the vehicle and an inclination sensor that makes it possible to measure the inclination of the road.

The operation of the device 22 itself is known. Typically, during an uphill start-up, when a driver of the vehicle 2 releases a brake pedal, the device 22 maintains the vehicle 2 at standstill (by means of the braking system), for a duration t giving the driver the time to switch from the brake pedal to an accelerator pedal. The duration t is determined, for example, on the basis of a measurement of the inclination of the road.

The vehicle 2 also comprises a control device 24 for controlling the start-up of the vehicle 2.

The device 24 includes a sensor 26 for measuring an engine temperature. In this description, the term "engine temperature" denotes any quantity representative of the temperature of the internal combustion engine 6. Such quantities are, for example, the temperature of a cooling liquid (water temperature) or also the engine oil temperature. Here, the sensor 26 measures the engine oil temperature.

The device 24 also includes a sensor 28 for measuring the engine speed and a sensor 29 for measuring the atmospheric pressure.

Finally, the device 24 comprises a control unit 30 which is capable of:

acquiring the measurements originating from the sensors 26, 28 and 29, processing these measurements, and controlling the internal combustion engine 6, the clutch 16, the gearbox 8, and the assist device 22 for uphill start-up assistance according to a result of this processing to start the vehicle 2.

For this purpose, the unit 30 is connected electrically to the sensors 26, 28, 29, to the clutch 16, to the gearbox 18, and to the assist device 22 for uphill start-up assistance.

Advantageously, the unit 30, the sensors 26, 28, the internal combustion engine 6, the clutch 16, the controlled mechanical gearbox 18, and the assist device 22 for uphill start-up assistance are connected to each other by means of a CAN (Control Area Network) network so as to be able to share data.

In this example, the control unit 30 is produced from a programmable electronic controller capable of executing instructions recorded on a data recording medium. For this purpose, the unit 30 is connected here to a memory 32 containing instructions for carrying out the method of FIG. 2.

The memory 32 also contains the maps 34, 35, 36.

The map 34 defines an engine speed threshold S1 under the operating conditions of the vehicle 2 corresponding to a non-zero fuel injection into the combustion chambers of the internal combustion engine 6. The threshold S1 corresponds to an engine speed that cannot be achieved if there is no combustion of the fuel in the combustion chambers of the engine. For this purpose, the threshold S1 is selected to be strictly greater than the maximum engine speed that can be achieved without combustion in the combustion chambers during the start-up of the vehicle 2. In other words, the threshold S1 is greater than the maximum engine speed that can be achieved when the electrical machine 20 is the only source that rotationally drives the crankshaft output shaft. Here, the threshold S1 depends on the engine temperature and the atmospheric pressure.

Subsequently, the internal combustion engine is said to be in an "autonomous engine" state if:

the fuel injection into the combustion chambers of the internal combustion engine 6 is non-zero, and the engine speed is greater than or equal to the threshold S1.

The map 35 defines a delay duration T1 since the change of the internal combustion engine 6 to the "autonomous engine" state.

The duration T1 is predefined in such a manner that once the delay has elapsed, if a braking system of the vehicle 2 is released, the engine torque is sufficiently high to allow the movement of the vehicle 2 only in the forward direction without backward movement. In the example, the duration T1 depends on the engine temperature and the atmospheric pressure.

Here, the duration T1 corresponds to the minimum duration, from the change of the internal combustion engine 6 to the "autonomous engine" state, so that the pistons of the internal combustion engine 6 pass through two top dead centers in the cylinders. The duration T1 is determined preferably so that during the start-up of the vehicle 2, the driver does not have a sensation of retention of the braking system. Typically, this duration is between 100 ms and 150 ms.

The map 36 defines a delay duration T2 since the emission of an "available torque" signal. This signal is presented further below in reference to the method of FIG. 2.

The duration T2 corresponds to the delay duration required for the internal combustion engine 6 to achieve stabilized conditions (stable quantity of fuel injected into the combustion chambers and stable engine speed) enabling the precise calculation or estimation of the engine torque. Typically, this duration is between 100 ms and 150 ms. The calculation or estimation of the torque is precise when the calculated or estimated torque is equal to the actual torque to the nearest 5 N/m. Here, the duration T2 depends on the engine temperature and the atmospheric pressure.

In the example, the maps 34, 35 and 36 are tables with two entries: the engine temperature and the atmospheric pressure.

Figure 2:
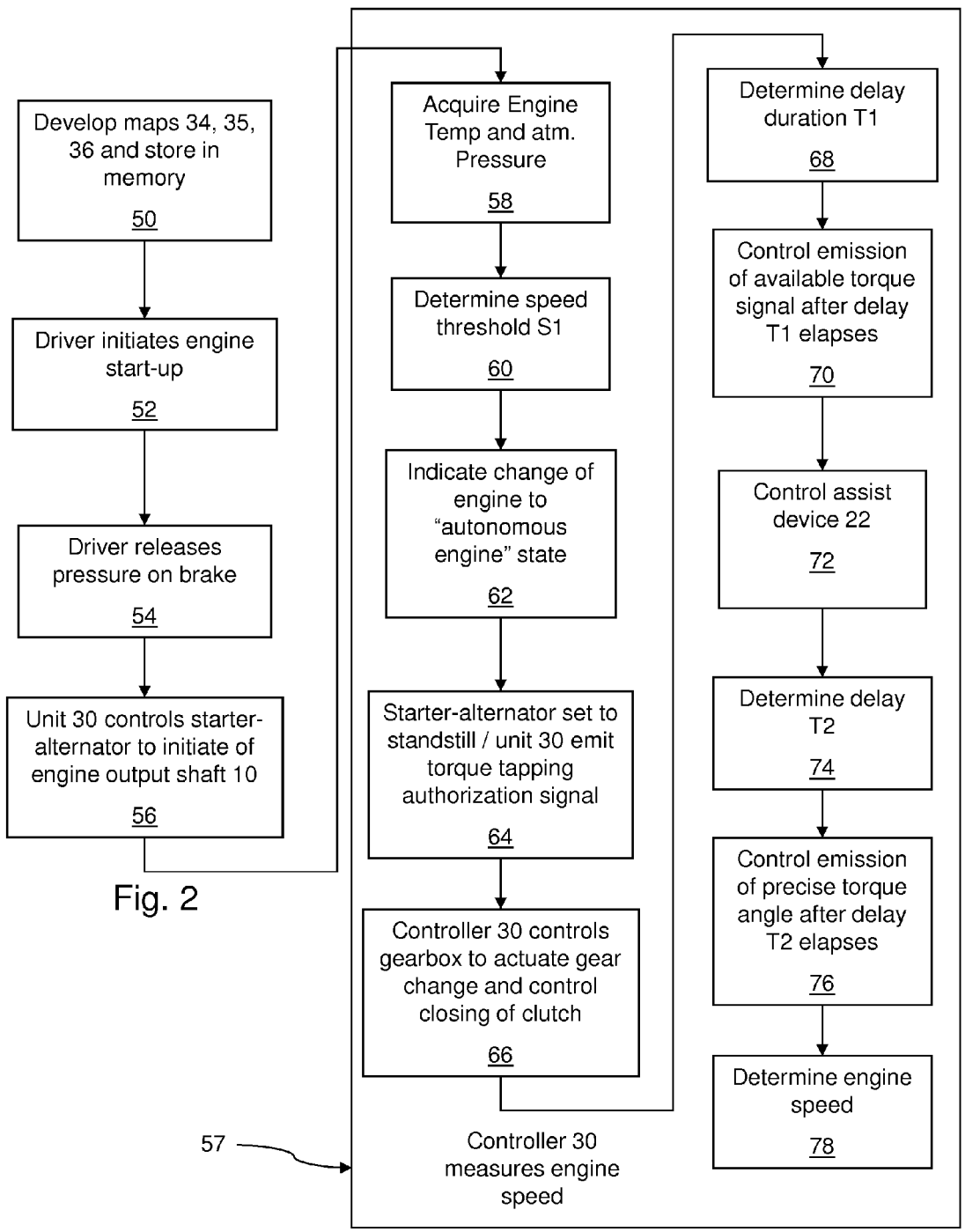
FIG. 2 is a flowchart of a method for controlling the start-up of the vehicle of FIG. 1.

A method for controlling the start-up of a stop and start vehicle will now be described in reference to FIG. 2.

During a development step 50, the maps 34, 36 are constructed and prerecorded in the memory 32.

The maps 34, 35, 36 are constructed, for example, by a simulation using a model of the vehicle 2. Typically, during the adjustment, the engine temperature and the atmospheric pressure are modified step by step, independently of each other, in predetermined ranges of values. For each association of an engine temperature and an atmospheric pressure, start-ups of the vehicle 2 are simulated so as to determine the lowest speed threshold S1, and shortest delay durations T1 and T2. Once the threshold S1, and the durations T1 and T2 have been obtained, they are stored in memory. By repeating this process, the maps 34, 35 and 36 are constructed and stored in memory.

During a step 52 of use of the vehicle 2, a driver controls the start-up of the internal combustion engine 6. For example, the vehicle 2 is initially at standstill at a three-color traffic light on an uphill road. The clutch 16 is open so that the shafts 10 and 12 are not connected to each other. The internal combustion engine 6 is at standstill. The expression "internal combustion engine" at standstill refers to the fact that the quantity of fuel injected into the combustion chambers of the internal combustion engine 6 is zero. Initially, the driveshaft 12 and the crankshaft output shaft 10 are disconnected.

In the example, the driver starts the internal combustion engine 6 again in the form of an assisted start-up.

For this purpose, during a step 54, the driver releases the pressure on the brake pedal and actuates the accelerator pedal.

During a step 56, the unit 30 controls the starter alternator so as to initiate the rotation of the crankshaft output shaft 10. The engine speed then increases gradually during a phase 57.

During this phase 57 of increase in the engine speed, the fuel injection is controlled, the unit 30 measures the engine speed periodically by means of the sensor 28, and one proceeds to the following steps.

During a step 58, the unit 30 acquires the measurements of the engine temperature and of the atmospheric pressure originating from the sensors 26, 29.

During a step 60, the unit determines the speed threshold S1 corresponding to the engine temperature and the atmospheric pressure measured by the sensors 26, 29, on the basis of the map 34.

When the engine speed measured by the sensor 28 is greater than the speed threshold S1, the unit 30 immediately indicates the change of the engine to the "autonomous engine" state during a step 62.

In response to the "autonomous engine" state indication, the starter alternator is set to standstill, and the unit 30 emits a torque tapping authorization signal during a step 64.

In response to the emission of the torque tapping authorization signal, during a step 66, the unit 30 controls the controlled gearbox 18 so as to actuate the change from a first gear.

Moreover, during this step 66, the unit 30 controls the closing of the clutch 16 in order to mechanically connect the driveshaft 12 to the output shaft 10. The closing control is carried out according to a predefined engine speed set value to control the engine speed based on this predefined set value. This controlling of the speed leads to the following behavior. If the clutch closing causes a decrease in the engine speed, because the tapped torque is greater than the torque that the engine can supply, then the clutch is reopened slightly in order to decrease the torque tapped by the driving wheels and thus cause the engine speed to increase. Conversely, if the engine speed exceeds the threshold S1, the clutch is controlled so that it closes slightly more and thus taps more torque. This control is used as long as the clutch is not completely closed, that is as long as the speed of the output shaft of the clutch, which is mechanically connected to the driving wheels, is not equal to the engine speed. This control thus makes it possible to slip the clutch disks to varying degrees to keep the engine speed equal to the predefined set value. Under these conditions, the clutch is gradually closed and the internal combustion engine 6 no longer stalls. When the clutch is closed, the shafts 10 and 12 are coupled and the vehicle 2 is capable of moving.

During a step 68, the unit 30 determines a delay duration T1 on the basis of the engine temperature and the atmospheric pressure measured by the sensors 26, 29, and the map 34.

During a step 70, the unit 30 delays for the duration T1 determined during the step 68. Once this duration T1 since the autonomous engine state indication has elapsed, the unit 30 controls the emission of an available torque signal.

During a step 72, the unit 30 controls the assist device 22 for uphill start-up assistance in response to the emission of the available torque signal. For example, the braking system is gradually released until it allows the movement of the vehicle 2. The delay duration T1 guarantees for the driver that, during the start-up of the vehicle 2, this vehicle 2 will move only in the forward direction. The delay duration T1 also prevents any backward movement of the vehicle 2 due to the inclination of the road.

During a step 74, the unit 30 determines a delay duration T2 on the basis of the engine temperature and the atmospheric pressure measured by the sensors 26, 29, and of the map 36.

During a step 76, the unit 30 delays for the duration T2 determined during the step 76. Once this duration T2 has elapsed since the emission of the available torque signal, the unit 30 controls the emission of a precise torque signal. The emission of this signal means that the injection and engine speed conditions are sufficiently stable to be able to determine the engine torque with precision.

Thus, in response to the emission of the precise torque signal, the unit 30 determines the engine torque, by calculation or by estimation, based on the quantity of fuel injected and the engine speed measured by the sensor 28 during a step 78. This information is used, for example, during a rolling phase of the vehicle 2, in order to determine the appropriate time for controlling the change from a gear of the controlled gearbox 18.

Numerous other embodiments are possible.

For example, the internal combustion engine 6 is not necessarily a Diesel engine. It can be a controlled ignition engine (i.e., a gasoline engine).

The torque tapping authorization signal can be omitted. In this case, the gearbox 18 is controlled directly on the basis of the "autonomous engine" state indication.

The assist device for uphill start-up assistance can be omitted from the vehicle 2.

The controlled gearbox can include the clutch 16.

The maps 34, 35, and 36 are not necessarily tables. They can be functions that are stored in the memory 32 and use the engine temperature and/or the atmospheric pressure as input parameters. Other parameters besides the engine temperature or the atmospheric pressure can be taken into consideration for the construction of the maps 34, 35, and 36.

The threshold S1 and the durations T1 and T2 do not necessarily depend on the engine temperature and the atmospheric pressure. The threshold S1 and the durations T1 and T2 can be constants, for example.

The set value to which the closing of the clutch 16 is controlled can be a level (the set value is a constant in that case) or any other type of set value. For example, the set value can be a speed level (the set value is a linear curve in that case) or an acceleration level (the set value is an exponential curve in that case).

What has been described above for the rapid actuation of the device 22 can be used independently of what has been described for the rapid control of the gearbox 18.

The invention claimed is:

1. A control device for controlling the start-up of a vehicle comprising an engine start-stop system, the control device comprising:
 sensors for measuring or estimating a quantity of fuel injected into the combustion chambers and an engine speed, and
 an electronic controller programmed:
   to actuate the start-up of the vehicle,
 wherein the controller is programmed:
   to indicate an autonomous engine state in response to the simultaneous occurrence of the injection of fuel into combustion chambers of the internal combustion engine and an internal combustion engine speed above a predefined threshold S1, the threshold S1 being equal to an engine speed that cannot be achieved without combustion in the combustion chambers during the start-up of the vehicle (2),
   in response to the autonomous engine state indication, to control the closing of a clutch according to a predefined engine speed set value to control the engine speed to this predefined set value, the clutch making it possible to mechanically connect the driving wheels of the vehicle to a crankshaft output shaft of the engine;
   to delay the use of an assist device for uphill start-up assistance until the end of a duration T1 elapsed since the autonomous engine state indication, the duration T1 being predefined in such a manner that once the delay has elapsed, if a braking system is released, the engine torque is sufficiently high to cause movement of the vehicle only in the forward direction without backward movement,
   to emit an available torque signal once the duration T1 has elapsed, and
   to control the assist device for uphill start-up assistance in response to the re-emission of the available torque signal to release the braking system.

2. The control device of claim 1, wherein said control device is incorporated in a vehicle.

3. A method for controlling a start-up of a vehicle comprising an engine start-stop system, the method comprising:
 actuating the start-up of the vehicle,
 indicating an autonomous engine state in response to the simultaneous occurrence of injection of fuel into combustion chambers of the internal combustion engine and an internal combustion engine speed above a predefined threshold S1, the threshold S1 being equal to an engine speed that cannot be achieved without combustion in the combustion chambers during the start-up of the vehicle,
 in response to the autonomous engine state indication, controlling closing of a clutch according to a predefined engine speed set value to control the engine speed to this predefined set value, the clutch enabling a mechanical connection of driving wheels of the vehicle to a crankshaft output shaft of the engine;
 delaying the use of an assist device for uphill start-up assistance until the end of a duration T1 elapsed since the autonomous engine state indication, the duration T1 being predefined in such a manner that once the delay has elapsed, if a braking system is released, the engine torque is sufficiently high to cause movement of the vehicle only in the forward direction without backward movement,
 emitting an available torque signal once the duration T1 has elapsed, and controlling the assist device for uphill start-up assistance in response to the re-emission of the available torque signal to release the braking system.

4. The method according to claim 3, in which the threshold S1 and/or the duration T1 are predefined according to a measured engine temperature and/or a measured atmospheric pressure.

5. The method according to claim 3, in which the method also comprises:
emitting a precise torque signal after a duration T2 has elapsed since the emission of the available torque signal, and
calculating or estimating the torque supplied by the engine in response to the emission of the precise torque signal.

6. The method according to claim 5, in which the duration T2 is predefined according to a measured engine temperature and/or a measured atmospheric pressure.

7. A data recording medium for storing a control method, wherein said data recording medium including instructions for carrying out a method according to claim 3, wherein the instructions are carried out by an electronic controller.

8. The method according to claim 3, wherein, the clutch is controlled to disconnect the driving wheels of the vehicle from the crankshaft output shaft as long as the autonomous engine state indication is not present.

* * * * *